US006966178B2

(12) United States Patent
Saito et al.

(10) Patent No.: US 6,966,178 B2
(45) Date of Patent: Nov. 22, 2005

(54) INTERNAL COMBUSTION ENGINE EXHAUST GAS PURIFICATION SYSTEM

(75) Inventors: Makoto Saito, Okazaki (JP); Shigeto Yahata, Obu (JP); Kazuharu Tochikawa, Kariya (JP)

(73) Assignee: Denso Corporation, Kariya (JP)

( * ) Notice: Subject to any disclaimer, the term of this patent is extended or adjusted under 35 U.S.C. 154(b) by 71 days.

(21) Appl. No.: 10/790,783

(22) Filed: Mar. 3, 2004

(65) Prior Publication Data

US 2004/0172933 A1 Sep. 9, 2004

(30) Foreign Application Priority Data

Mar. 3, 2003 (JP) ............................ 2003-055087
Jan. 23, 2004 (JP) ............................ 2004-015555

(51) Int. Cl.[7] ................................................ F01N 3/00
(52) U.S. Cl. ............................ 60/295; 60/297; 60/311
(58) Field of Search .......................... 60/285, 295, 297, 60/299, 300, 303, 311

(56) References Cited

U.S. PATENT DOCUMENTS 5,063,736 A * 11/1991 Hough et al. ................. 60/286
5,121,601 A * 6/1992 Kammel ...................... 60/275
5,195,316 A * 3/1993 Shinzawa et al. ............. 60/274
6,090,187 A * 7/2000 Kumagai ..................... 95/278
6,568,178 B2 * 5/2003 Hirota et al. ................ 60/297
6,820,418 B2 * 11/2004 Nakatani et al. .............. 60/297

FOREIGN PATENT DOCUMENTS

JP 7-332065 12/1995

* cited by examiner

*Primary Examiner*—Binh Q. Tran
(74) *Attorney, Agent, or Firm*—Nixon & Vanderhye P.C.

(57) ABSTRACT

An amount ML of particles accumulated in small holes of a particulate filter is calculated in accordance with a pressure drop ΔP detected by a pressure sensor and a characteristic line. The characteristic line is defined by a first characteristic line and a second characteristic line, which is defined after exceeding a transition point TP. When the particles accumulated in the small holes are burned while remaining accumulated particles on the surface, the second characteristic line is shifted in a parallel fashion and compensated. Thus, the characteristic line is corrected so that the accumulation amount ML can be precisely calculated, even if particles accumulated in small holes are burned and the characteristic is changed.

12 Claims, 11 Drawing Sheets

INTERNAL COMBUSTION ENGINE EXHAUST GAS PURIFICATION SYSTEM

CROSS REFERENCE TO RELATED APPLICATION

This application is based on Japanese Patent Application No. 2003-55087 filed on Mar. 3, 2003, and No. 2004-15555 filed on Jan. 23, 2004, the disclosures of which are incorporated herein by reference.

BACKGROUND OF THE INVENTION

1. Field of the Invention

The present invention is related to an exhaust-gas purification system of an internal combustion engine, specifically a regeneration method of a particulate filter.

2. Description of Related Art

Recently, emission control has been required for internal combustion engines mounted in vehicles. Especially for a diesel engine, particles, such as soot (carbon black) and SOF (soluble organic fraction of particulate matter), contained in exhausted gas need to be removed in addition to CO, HC and NOx. Accordingly, a particulate filter is provided in an exhaust passage to collect exhausted particles in exhaust gas.

Exhaust gas flowing into the particulate filter passes through a porous partition wall so that the exhausted particles are collected on the surface of the partition wall and the small holes. If the amount of the collected particles excessively increases, flow resistance increases in the particulate filter and back pressure in the engine increases. As a result, engine power decreases. Therefore, the particles collected by the particulate filter need to be regularly removed in a regeneration process.

An oxidation catalyst, such as platinum, is normally provided in particulate filters so that regeneration is performed while the vehicle is operated. In this case, fuel is injected in an exhaust stroke (post injection), so that fuel is supplied to the particulate filter for removing the particles accumulated in the particulate filter. The accumulated particles are not apt to be oxidized compared with fuel. However, the accumulated particles are oxidized using combustion heat of the injected fuel in the post injection, and are removed.

If regeneration of the particulate filter is frequently performed, fuel efficiency decreases. Otherwise, if the interval of the regeneration becomes long, the amount of the accumulated particles excessively increases, and the excessive amount of the accumulated particles may be rapidly burned in the regeneration process. In this case, the particulate filter becomes excessively high in temperature, and the particulate filter may be broken. Therefore, preferably, the amount of the accumulated particles are evaluated, and the regeneration timing is determined based on the amount of the accumulated particles. According to an exhaust gas purification system disclosed in JP-A-7-332065, the flow resistance due to the increase of the amount (particle accumulation amount) of the accumulated particles in the particulate filter is detected and used for determination of the regeneration timing of the particulate filter. As the particle accumulation amount in the particulate filter increases, the flow resistance (i.e., pressure drop) of the particulate filter increases. If the pressure drop of the particulate filter exceeds a predetermined value, the regeneration is started.

However, it is difficult to precisely measure the particle accumulation amount in this exhaust gas purification system. This is because, the actual particle accumulation amount does not necessarily coincide every time, even if the engine operating condition, such as the pressure drop, is same.

Continuing, the particles accumulated in the particulate filter are partially burned due to the high-temperature exhaust gas depending on the operating condition of the engine, even before the regeneration of the particulate filter. The relationship between the particle accumulation amount and the pressure drop is different between when the particles are accumulated in the particle filter and when the accumulated particles are burned and decrease. Therefore, a measurement error can be caused in the measurement of the particle accumulation amount due to the difference between an increasing characteristic of the particle accumulation amount and a decreasing characteristic of the particle accumulation amount. The measurement error may affect the regeneration timing determination. Furthermore, if the regeneration is not completed and terminated in the previous regeneration, the particles accumulated in the particulate filter are partially burned, and the measurement error may occur.

SUMMARY OF THE INVENTION

In view of the foregoing problems, it is an object of the present invention to provide an exhaust-gas purification system of an internal combustion engine that can appropriately determine the regeneration timing of the particulate filter.

According to the present invention, an exhaust gas purification system is used for an internal combustion engine. The exhaust gas purification system has a particulate filter in an exhaust passage for collecting particles included in the exhaust gas. Particles accumulated and accumulated in the particulate filter are burned and removed so that the particulate filter is recovered. The exhaust gas purification system includes a pressure drop detecting unit, a regeneration determining unit, an exhaust particle detecting unit, and a correcting unit. The pressure drop detecting unit detects the pressure drop $\Delta P$ of the particulate filter. The regeneration determining unit defines a characteristic (accumulation characteristic) of a relationship between the accumulation amount of the particles and the pressure drop. The regeneration determining unit has a first characteristic line and a second characteristic line. The first characteristic line is a straight line passing an initial point IP in which the accumulation amount ML is 0. The second characteristic line is a straight line having a slope that is less steep compared with a slope of the first characteristic line. The accumulation characteristic is defined by the first characteristic line and the second characteristic line. The pressure drop increases along with the first characteristic line from the initial point to a predetermined increasing transitional point. The pressure drop further increases along with the second characteristic line from the increasing transitional point. The regeneration determining unit calculates the accumulation amount based on the accumulation characteristic and an operating condition of the internal combustion engine which includes at least the pressure drop. The regeneration determining unit determines whether the accumulation amount exceeds a predetermined regeneration-starting amount for determining whether the regeneration of the particulate filter needs to be performed. The exhaust particle detecting unit detects a combusting condition of the particles accumulated in the particulate filter. The correcting unit corrects the accumulation characteristic so that the second characteristic line is shifted substantially parallel to a direction in which the accumulation amount becomes large when the particles are in the combusting condition.

Alternatively, the regeneration determining unit has an increase characteristic line and a decrease characteristic line. The increase characteristic line protrude in the direction where the pressure drop becomes large, and passes the initial point. The decrease characteristic line protrudes in the direction where the pressure drop becomes small. The accumulation characteristic is defined by the increase characteristic line and the decrease characteristic line. The pressure drop increases along with the increase characteristic line from the initial point, and decreases along with the decrease characteristic line to the initial point. The regeneration determining unit calculates the accumulation amount based on the accumulation characteristic and an operating condition of the internal combustion engine which includes at least the pressure drop. The regeneration determining unit determines whether the accumulation amount exceeds a predetermined regeneration-starting amount for determining whether the regeneration of the particulate filter needs to be performed. The regeneration determining unit calculates the accumulation amount based on the increase characteristic when the particles are in a non-combusting condition, and calculates the accumulation amount based on the decrease characteristic when the particles are in the combusting condition.

Thus, the accumulation characteristic is appropriately corrected so that the accumulation amount ML can be precisely calculated. Therefore, the accumulation amount is calculated when the regeneration of the particulate filter can be precisely set and the interval of the regeneration can be properly set.

BRIEF DESCRIPTION OF THE DRAWINGS

The above and other objects, features and advantages of the present invention will become more apparent from the following detailed description that references the accompanying drawings. In the drawings.

DETAILED DESCRIPTION OF THE PREFERRED EMBODIMENTS

[First Embodiment]

Figure 1:
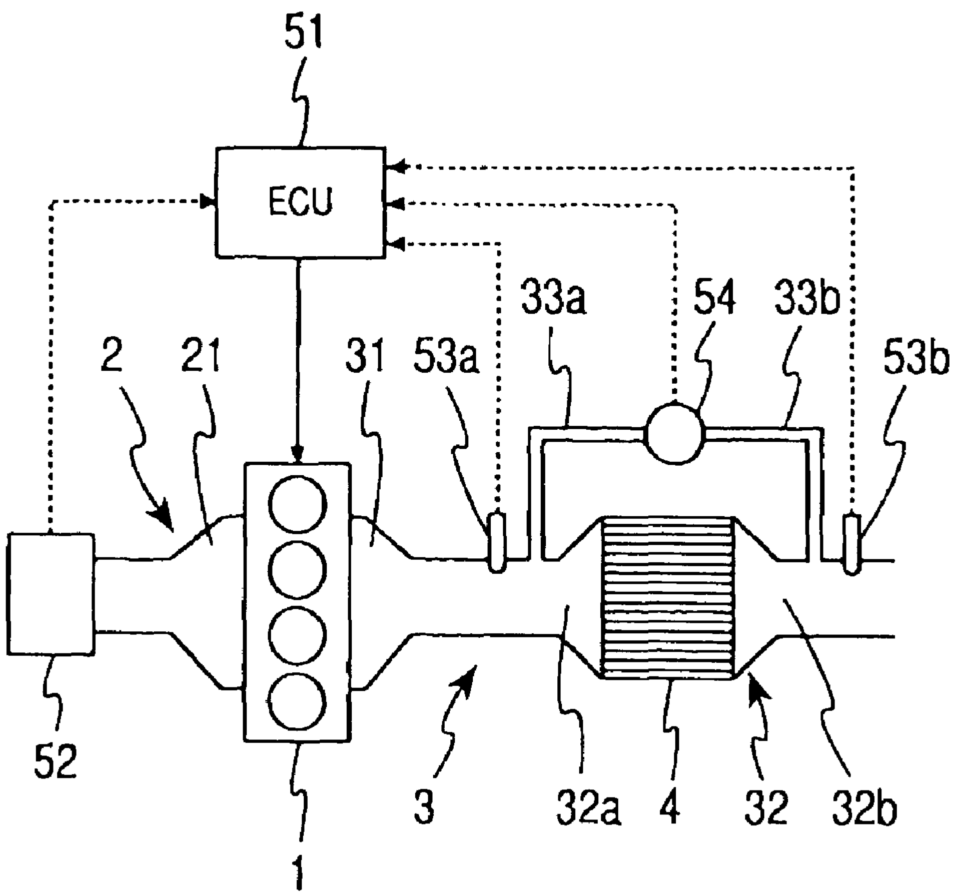
FIG. 1 is a schematic diagram of a structure of an internal combustion engine using an exhaust gas purification system according to a first embodiment of the present invention.

As shown in FIG. 1, a four-cylinder engine body (engine) 1 of a diesel engine is connected with an intake manifold 21, which is upstream of the engine with respect to the flow of air. The intake manifold 21 is the most downstream section of an intake passage 2. The engine body 1 is also connected with an exhaust manifold 31, which is downstream of the engine body 1. The exhaust manifold 31 is the most upstream section of an exhaust passage 3. A collecting section of the exhaust manifold 31 of the exhaust passage 3 is connected with a particulate filter 32.

The particulate filter 32 is made of a porous ceramic, such as cordierite and silicon carbide. Honeycomb structural flow passages of the porous ceramic are partially closed, and the filter body 4 is constructed. Exhaust gas flows from cylinders of the engine body 1 to an intake port 32*a*. The exhaust gas flows from the intake port 32*a* to the filter body 4 of the particulate filter 32 and passes through partition walls of the porous ceramic in the filter body 4, and flows to the downstream side of the exhaust port 32*b*. Exhausted particles PM included in the exhaust gas are collected by the porous ceramic while the exhaust gas passes through the particulate filter 32 and are accumulated in the porous ceramic as the vehicle is driven. An oxidation catalyst is supported on the surface of the filter body 4 of the particulate filter 32. The oxidation catalyst is mainly made of a noble metal, such as platinum and palladium. The oxidation catalyst performs oxidation, combustion and elimination of the exhausted particles PM accumulated in the particulate filter 32 under a specific temperature condition in a regeneration process of the particulate filter 32.

An ECU (electronic controlling unit) 51 is provided for controlling engine devices, such as an injector of the engine body 1. Various signals of operational conditions are input to the ECU 51. A sensor is provided for sensing the amount of the exhausted particles PM (accumulated particles PM) accumulated in the particulate filter 32, and transmits the sensing signal to the ECU 51. Temperature sensors 53*a*, 53*b* are provided in the exhaust passage 3. The temperature sensors 53*a*, 53*b* penetrate the wall of the exhaust passage 3 for detecting the temperature of the exhaust gas. The temperature sensor 53*a* is provided in an immediately upstream side of the particulate filter 32. The temperature sensor 53*b* is provided in an immediately downstream side of the particulate filter 32. The temperature (DPF intake temperature) of the exhaust gas passing through the intake port 32*a* of the particulate filter 32 is detected by the temperature sensor 53*a*. The temperature (DPF exhaust temperature) of the exhaust gas passing through the exhaust port 32*b* of the particulate filter 32 is detected by the temperature sensor 53*b*. The temperature (DPF temperature) of the particulate filter 32 is calculated in accordance with the DPF intake temperature and the DPF exhaust temperature.

A first branch passage 33*a* and a second branch passage 33*b* are connected with the exhaust passage 3. The first branch passage 33*a* branches from the exhaust passage 3 on the immediately upstream side of the particulate filter 32. The second branch passage 33*b* branches from the exhaust passage 3 on the immediately downstream side of the particulate filter 32. A differential pressure sensor 54 (pressure drop detecting unit) is connected with the first branch passage 33*a* and the second branch passage 33*b* to detect any differential pressure between the intake port 32*a* and the exhaust port 32*b*. The differential pressure detected by the differential pressure sensor 54 is generated by the particulate filter 32.

An air flow meter 52 is provided in the intake passage 2 for detecting an intake gas flow rate. Other parameters related to an operating condition, such as an accelerator pedal position and a cooling water temperature, are input to the ECU 51. The ECU 51 is mainly constructed with a microcomputer. A ROM provided in the ECU 51 includes an operating control program, a regeneration control program, specific data, and the like. The operating control program controls devices of the engine 1. The regeneration-control program calculates the amount ML (PM-accumulation amount ML) of the exhausted particles PM accumulated in the particulate filter 32. The regeneration-control program also determines whether regeneration of the particulate filter 32 needs to be performed based on the calculated value of the PM-accumulation amount ML. The specific data is stored for defining characteristics (accumulation characteristic) of the PM-accumulation amount ML. The accumulation characteristic is used in a calculation performed by the regeneration-control program.

Figure 2:
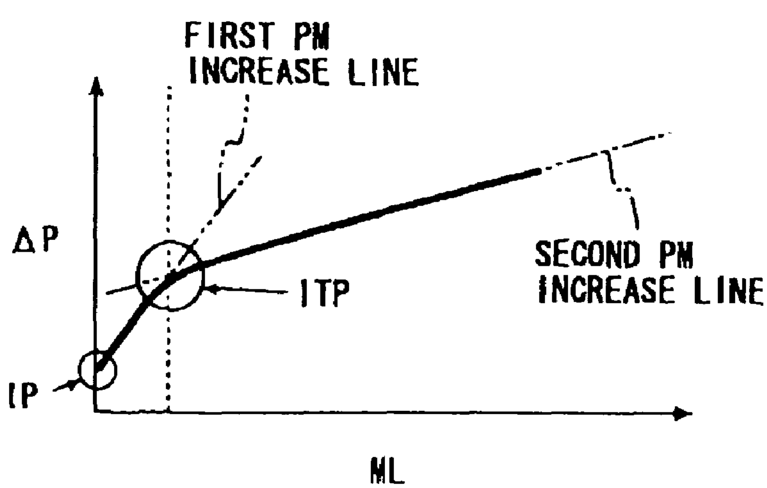
FIG. 2 is a graph of a relationship between a accumulated amount ML of particles accumulated in a particulate filter and a pressure drop ΔP of the particulate filter.

Exhausted particles PM are not accumulated in a new particulate filter 32 and a completely recovered particulate filter 32. As shown in FIG. 2, when exhausted particles PM are accumulated in the new particulate filter 32 or the completely recovered particulate filter 32, the pressure drop ΔP increases as the PM-accumulation amount ML increases. The profile of the relationship between the pressure drop ΔP and the PM-accumulation amount ML becomes an upwardly sloping line.

The accumulation characteristics of the relationship between the pressure drop ΔP and the accumulation-amount ML are shown by straight lines. The slope of the straight line changes at a transitional point (increasing-transitional point ITP) where the PM-accumulation amount ML becomes a specific value (increasing-transitional accumulation amount ITML). The degree of the slope of the accumulation characteristic becomes small when the PM-accumulation amount ML exceeds the increasing-transitional accumulation amount ITML. The accumulation characteristic can be approximated by two straight lines. The actual accumulation characteristic can also be precisely approximated by the two straight lines. Therefore, approximation of the accumulation characteristic can be easily performed.

Figure 3A:
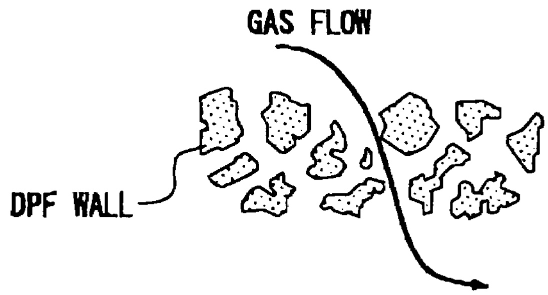
FIGS. 3A to 3C are schematic diagrams of a process where exhausted particles are accumulated in the particulate filter.
Figure 3B:
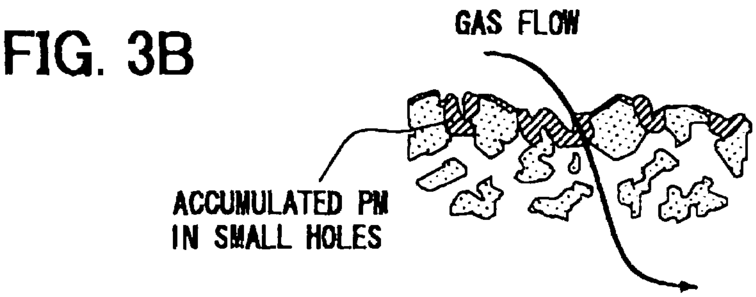
Figure 3C:
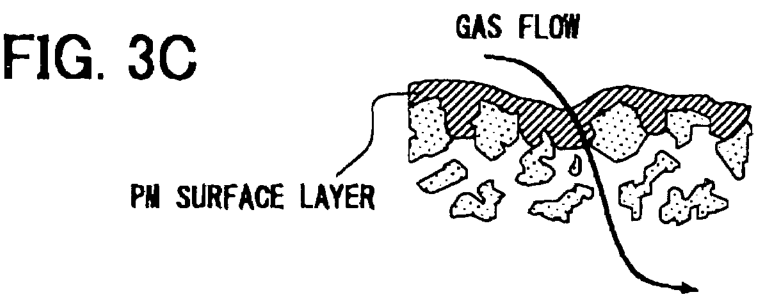

As shown in FIGS. 3A–3C, the exhausted particles PM accumulation on the partition wall (DPF wall) of the particulate filter body 4. The PM accumulation-amount ML increases in this order of FIGS. 3A–3C. FIG. 3A shows a condition of the new particulate filter 32 or the completely recovered particulate filter 32. Exhausted particles PM are not accumulated in the particulate filter 32 in this condition. Pressure drop ΔP is generated when exhausted particles PM pass through the DPF walls of the filter body 4. The pressure drop ΔP depends on a shape of the particulate filter 32.

As shown in FIG. 3B, exhausted particles PM are accumulated on the surface of the DPF wall located in the upstream portion of the exhaust gas flow, and plug small holes of the particulate filter 32. Pressure drop ΔP increases as the exhausted particles PM plug the small holes of the particulate filter 32. As shown by the arrow in FIG. 3B, the flow of the exhaust gas is oriented to the small holes. Therefore, plugging of the small holes is a dominant factor of the increase of pressure drop ΔP, at this initial state.

As shown in FIG. 3C, the small holes are plugged, and the PM-accumulation layer is formed on the surface of the DPF walls. Subsequently, the exhausted particles PM are further accumulated, and the thickness of the PM-accumulation layer further increases. In this situation, a dominant factor of the increase of the pressure drop ΔP is the thickening of the PM-accumulation layer covering the surface of the DPF wall.

A large number of the small holes are plugged, and the PM-accumulation layer is formed over the whole area of the particulate filter 32 at the increasing-transitional point ITP (FIG. 2). The situation before the increasing-transitional point ITP and the situation after the increasing-transitional point ITP have different dominant factors of the increase of the pressure drop ΔP. Exhausted particles PM can pass through the small holes when the small holes are not plugged by the exhausted particles PM. However, when the exhausted particles PM are collected in the small holes and the small holes are plugged, the pressure drop ΔP quickly increases. Referring back to FIG. 2, as shown by the first PM increase characteristic line, a change rate of the pressure drop ΔP (ΔP increasing rate) is relatively large with respect to the change of the PM-accumulation amount ML until most of the small holes are plugged at the increasing-transitional point ITP. On the contrary, as shown by the second PM increase characteristic line, the ΔP increasing rate is relatively small with respect to the change of the PM-accumulation amount ML after most of the small holes are plugged at the increasing-transitional point ITP. The ΔP increasing rate changes after the PM accumulation amount ML exceeds the increasing-transitional accumulation amount ITML.

Figure 4:
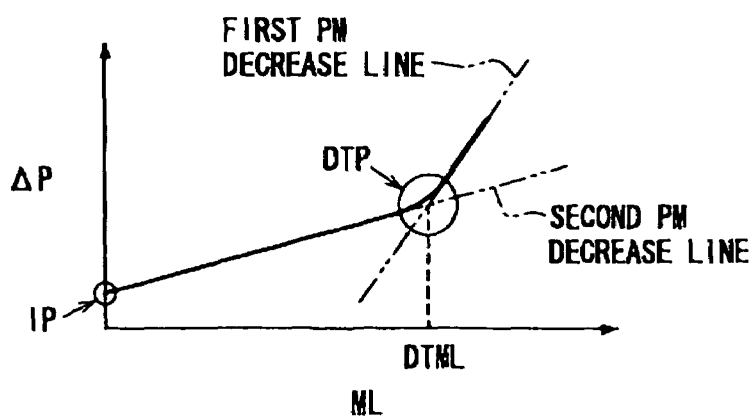
FIG. 4 is a graph of a relationship between the accumulated amount ML of particles and the corresponding pressure drop ΔP, while the accumulated particles are burned and eliminated.

As shown in FIG. 4, when the accumulated particles PM plugging the particulate filter 32 are burned, the PM-accumulation amount ML decreases along with accumulation characteristic lines. Here, the profile of the relationship between the pressure drop ΔP and the PM-accumulation amount ML becomes a downwardly sloping line, in the accumulation characteristic lines. The accumulation characteristic is shown by straight lines. A slope of the straight line changes at a point (decreasing-transitional point DTP) where the PM-accumulation amount ML becomes a specific value (decreasing-transitional accumulation amount DTML). Specifically, the accumulation characteristic is approximated by two straight lines. An actual accumulation characteristic can be precisely approximated by the two straight lines. Therefore, approximation of the accumulation characteristic can be easily performed.

Figure 5A:
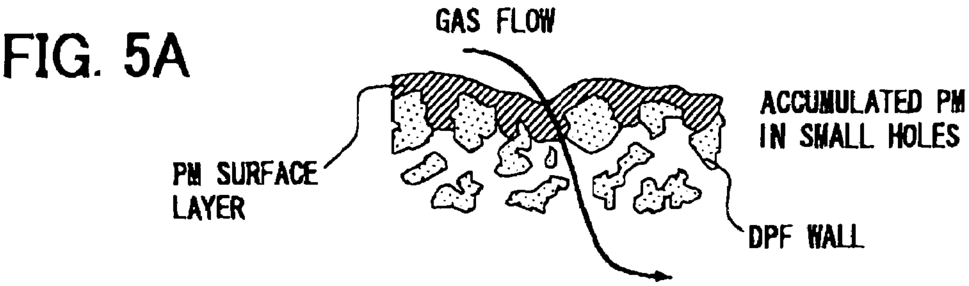
FIGS. 5A to 5C are schematic diagrams of a process where the particles accumulated in the particulate filter are burned and eliminated.
Figure 5B:
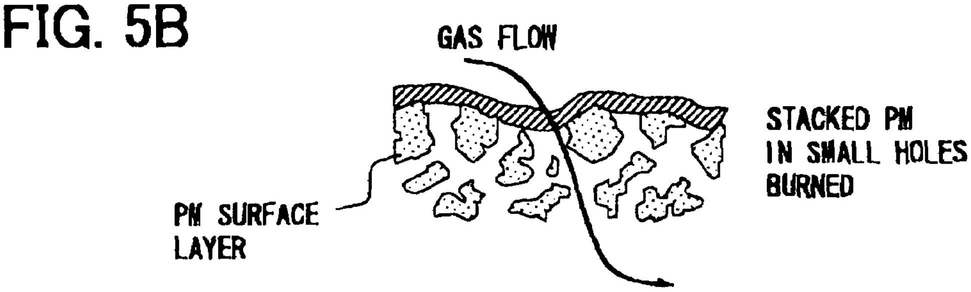
Figure 5C:
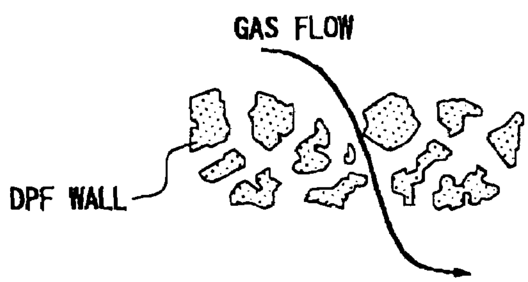

As shown in FIGS. 5A–5C, the exhausted particles PM accumulated in the particulate filter 32 are burned and eliminated, and the PM accumulation-amount ML decreases in this order. At first, the accumulated particles PM plugging the small holes are burned and eliminated as shown in FIGS. 5A and 5B. Subsequently, the exhausted particles PM accumulated on the surface of the DPF wall are burned and eliminated as shown in FIG. 5C. That is, the PM-accumulation layer formed over the whole area of the particulate filter 32 is eliminated in a late stage of the regeneration process.

As shown by the first PM-decrease characteristic line in FIG. 4, the pressure drop ΔP rapidly decreases by the elimination of the accumulated particles PM plugging the small holes. As shown by the second PM-decrease characteristic line, the decreasing degree of the pressure drop ΔP is small in a situation where the exhausted particles PM accumulated on the surface of the DPF wall are burned and eliminated. The first PM-decrease characteristic line corresponds to the process where the exhausted particles PM plugging the small holes are eliminated.

Figure 6:
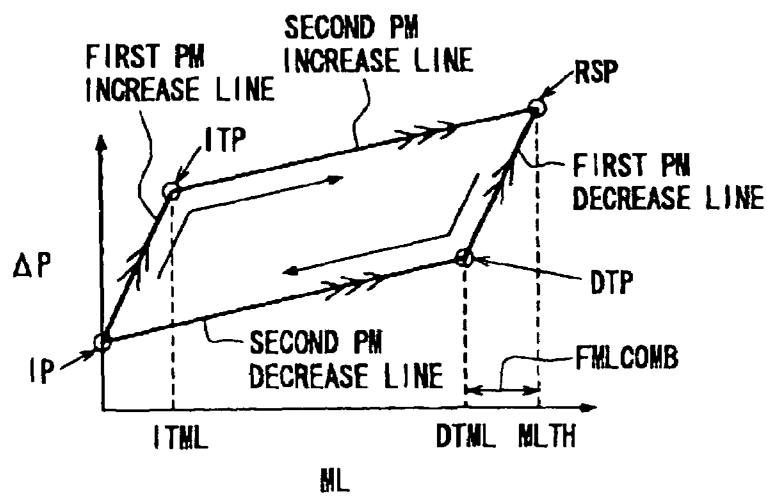
FIG. 6 is a graph of a relationship between the accumulated amount ML of particles and the corresponding pressure drop ΔP while the exhausted particles are accumulated in the particulate filter and the accumulated particles are burned and eliminated.

As shown in FIG. 6, the slope of the first PM increase characteristic line and the slope of the first PM-decrease characteristic line are substantially equivalent. That is, the first PM-increase characteristic line and the first PM-decrease characteristic line are substantially parallel because both characteristics result from the increase of the exhausted particles PM plugging the small holes and the decrease of the exhausted particles PM plugging the small holes, respectively.

The second PM-increase characteristic line corresponds to a process where the thickness of the PM-accumulation layer formed on the surface of the DPF wall increases after the small holes are substantially plugged. The second PM-decrease characteristic line corresponds to a process where the thickness of the PM-accumulation layer decreases after the exhausted particles PM plugging the small holes are substantially burned.

The slope of the second PM increase characteristic line and the slope of the second PM-decrease characteristic line are substantially equivalent. That is, the second PM-increase characteristic line and the second PM-decrease characteristic line are substantially parallel because both characteristics result from the increase of the accumulated particles PM forming the PM-accumulation layer and the decrease of the accumulated particles PM forming the PM-accumulation layer, respectively.

The first PM-increase characteristic line, before exceeding the increasing-transitional point ITP, and the second PM-increase characteristic line, after exceeding the increasing-transitional point ITP, are prestored in the ROM of the ECU 51 as normal characteristic lines. The characteristic lines are predetermined by experiments or the like.

Figure 7:
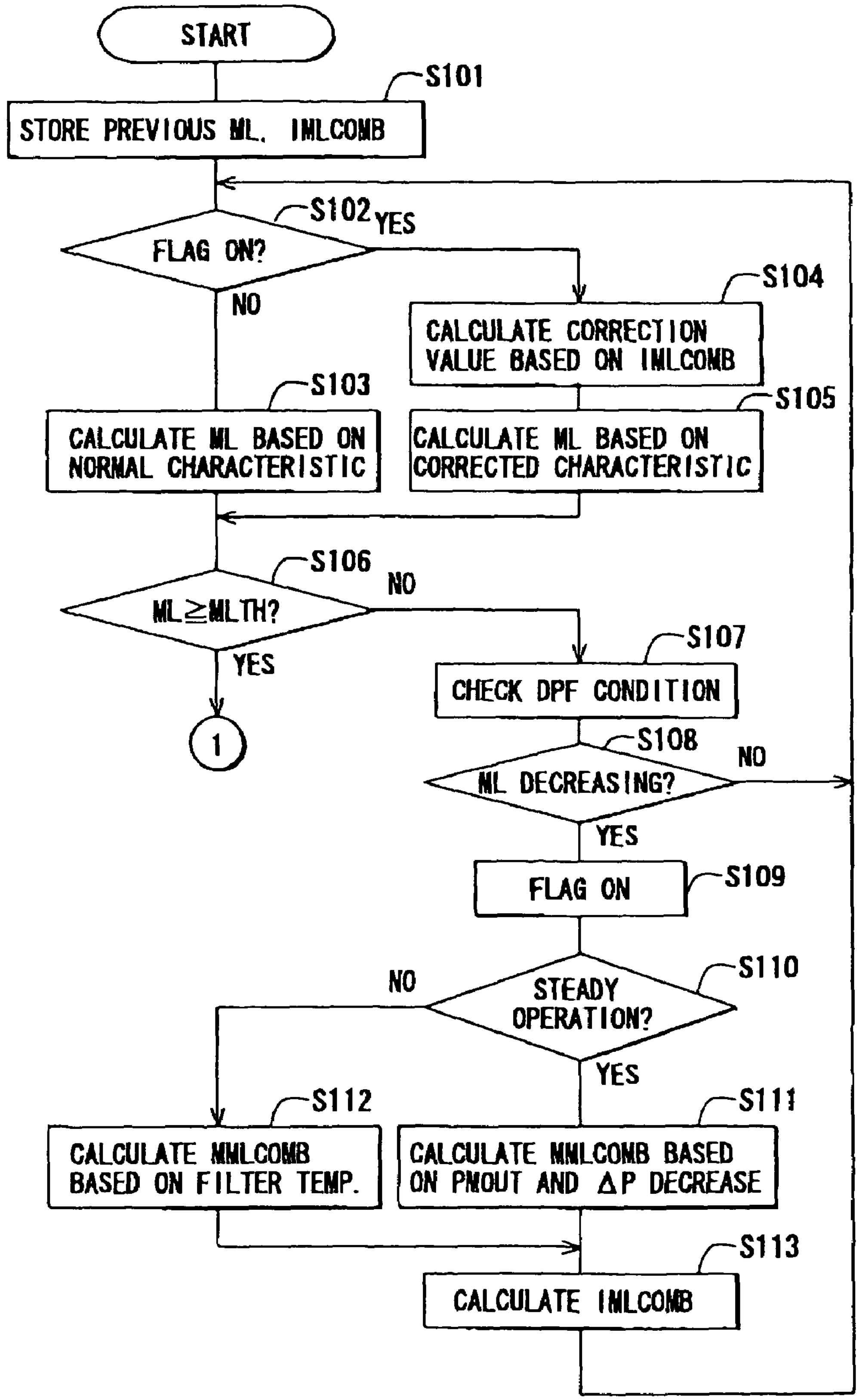
FIG. 7 is a first flowchart of a control routine executed by the ECU of the internal combustion engine using an exhaust gas purification system according to a first embodiment of the present invention.
Figure 8:
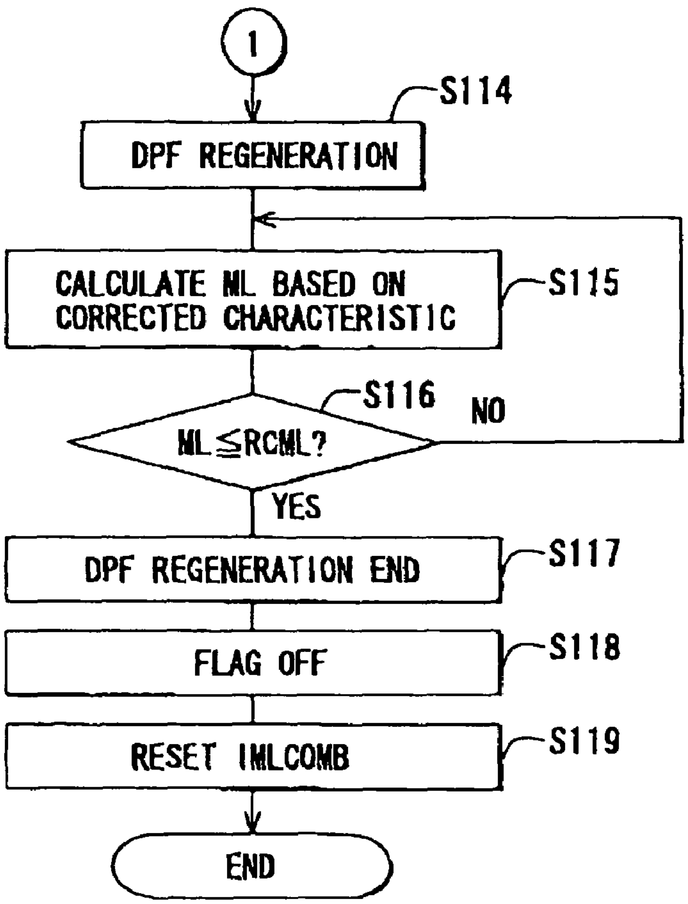
FIG. 8 is a second flowchart of a control routine executed by the ECU according to the first embodiment.

As shown in FIG. 7, at step S101, a previous PM-accumulation amount ML and a previous integrated PM-combustion amount IMLcomb are stored. Here, the previous PM-accumulation amount ML is a value calculated when the engine 1 is previously stopped. The previous integrated PM-combustion amount IMLcomb is an integrated combustion amount of exhausted particles PM accumulated in the particulate filter 32 before the regeneration of the particulate filter 32.

Step S102, S103, S105, S106 are regeneration determining units. Step S104 is a correcting unit. At step S102, it is determined whether a characteristic equation correcting flag FLC is turned on or not. If a negative determination is made at step S102, the PM-accumulation amount ML is calculated based on a normal characteristic equation at step S103, and the routine proceeds to step S106. If a positive determination is made at step S102, the routine proceeds to step S104 and a correction value (correction value) of the characteristic equation is calculated in accordance with the integrated PM-combustion amount IMLcomb (step S113), so that the characteristic equation is corrected. At step S105, the PM-accumulation amount ML is calculated in accordance with the characteristic equation corrected at step S104, and the routine proceeds to step S106.

Specifically, at step S103 and S105, the PM-accumulation amount ML is calculated based on an input value of the pressure drop ΔP, the normal characteristic equation and the corrected characteristic equation. However, the pressure drop ΔP detected by the pressure sensor 54 is affected by the flow speed of the exhaust gas flowing through the particulate filter 32. That is, if the flow speed becomes high, the differential pressure (pressure drop ΔP) increases as if the PM-accumulation amount ML is increased. Therefore, the flow speed of the exhaust gas is taken into account in the calculation of the PM-accumulation amount ML. The flow speed is measured based on the flow rate of the exhaust gas. Specifically, the pressure-drop ΔP detection signal is converted into a pressure-drop ΔP value in a predetermined flow speed. The value of the pressure-drop ΔP is substituted into the characteristic equation so that the PM-accumulation amount ML can be precisely calculated. Data maps and conversion equations are prestored in the ROM of the ECU 51.

Initially, the PM-accumulation amount ML is calculated in accordance with the first PM-increase characteristic line. When the PM-accumulation amount ML becomes equal to or greater than the increasing-transitional accumulation amount ITML, the first PM-increase characteristic line is switched to the second PM-increase characteristic line.

At step S106, it is determined whether the PM-accumulation amount ML is equal to or greater than a regeneration-starting amount MLth. The regeneration-starting amount MLth is predetermined based on a maximum value of the PM-accumulation amount ML. The maximum value of the PM-accumulation amount ML is a maximum allowable PM-accumulation amount ML. The regeneration of the particulate filter 32 need not be performed until the PM-accumulation amount ML becomes equal to or greater than the maximum value of the PM-accumulation amount ML (i.e., regeneration-starting amount MLth) because an engine's backpressure is not excessively large and the engine power is not excessively reduced before the PM-accumulation amount ML becomes equal to or greater than the regeneration-starting amount MLth.

If a positive determination is made at step S106, the routine following step S114 is executed, and the regeneration of the particulate filter 32 is performed. However, if the PM-accumulation amount ML is less than the regeneration-starting amount MLth, a negative determination is made at step S106, and the routine proceeds to step S107. Steps S107 and S108 are detecting units (exhaust particle detecting units) of a combusting condition of the accumulated particles PM. At step S107, a condition of the particulate filter 32 is evaluated. In detail, a condition of the exhausted particles PM accumulated in the particulate filter 32 is determined based on whether the amount of the exhausted particles PM is decreasing or not. The exhausted particles PM accumulated in the particulate filter 32 are burned so that the amount of the exhausted particles PM decreases.

Here, the DPF temperature is compared with the PM-combustion starting temperature. If the DPF temperature is higher than the PM-combustion starting temperature, the amount of the particles are determined to be decreasing. The PM-combustion starting temperature is predetermined based on a lower limit temperature of the combustion. The exhausted particles PM accumulated in the particulate filter 32 are estimated to be combusting, when the DPF temperature is higher than the lower limit temperature. Here, a predetermined time period can be added to the condition, in which the particles are determined to be combusting and the amount of the particles decreasing. In detail, if the DPF temperature is higher than the PM-combustion starting temperature for the predetermined period, the exhausted particles PM are determined to be combusting and the amount of the accumulated particles PM are decreasing in the particulate filter 32. In this case, the combusting condition can be steadily determined compared with a case in which the exhausted particles PM are determined to be combusting if the DPF temperature becomes higher than the PM-combustion starting temperature in a short time period. Other detection signals, such as operating condition of the engine 1, can be used for determining the comprehensive, that is, overall condition of the combustion of the accumulated particles PM.

At step S108, it is determined whether the PM-accumulation amount ML decreases or not according to the result of the estimation performed at step S107. If a positive determination is made at step S108, the routine proceeds to step S109, otherwise, if a negative determination is made at step S109, the routine returns to step S102. Even if the DPF temperature is higher than the PM-combustion starting temperature, the positive determination is not made at step S108 until the PM-accumulation amount ML becomes equal to or greater than the increasing-transitional accumulation amount ITML.

Steps S109 to S113 are integrating units (exhaust particle integrating units) for calculating the integrated PM-combustion amount IMLcomb. At step S109, the characteristic equation correcting flag FLC is turned on. At step S110, it is determined whether the operating condition is in a steady operating condition or not. Here, a temperature distribution of the particulate filter 32 is estimated, and if the temperature distribution is substantially uniform, the operating condition is determined to be in the steady operating condition, for example. Specifically, the difference between the DPF intake temperature and the DPF exhaust temperature is considered to be a degree of the temperature distribution (temperature uniformity) of the particulate filter 32. If the degree of the temperature distribution of the particulate filter 32 is smaller than a predetermined value, the operating condition is determined to be in the steady operating condition. Exhaust gas regularly flows into the particulate filter 32 at a substantially constant temperature during steady operating conditions. Accordingly, if the temperature distribution is substantially uniform, the operating condition can be determined to be in the steady operating condition.

The temperature of the exhaust gas flowing into the particulate filter 32 changes when the operating condition is in an unsteady operating condition. For example, the temperature of the exhaust gas flowing into the particulate filter 32 increases when the vehicle is accelerating. At that moment, a temperature difference arises between the intake port *32a* and the exhaust port *32b* in the particulate filter 32. The operating condition can be determined to be an unsteady operating condition, that is, when the temperature distribution is not uniform in the particulate filter 32.

At step S110, if the operating condition is determined to be in the steady operating condition, the routine proceeds to step S111. Here, step S110 is an operating condition determining unit. At step S111 (first calculating unit), a momentary PM-combustion amount MMLcomb is calculated based on a decreasing amount of the pressure drop ΔP and an amount of the exhausted particles PM (PM-exhaust amount PMout) discharged from the cylinders of the engine 1. Here, the momentary PM-combustion amount MMLcomb is a decreasing amount of the PM-accumulation amount ML in the particulate filter 32. Here, the present pressure drop ΔP is subtracted by the previous pressure drop ΔP stored in a memory, so that the decreasing amount of the pressure drop ΔP is calculated. Subsequently, the routine proceeds to step S113.

If a negative determination is made at step S110, and the operating condition is determined to be in the unsteady operating condition, the routine proceeds to step S112. At step S112 (second calculating unit), the momentary PM-combustion amount MMLcomb is calculated based on the temperature of the particulate filter 32. Subsequently, the routine proceeds to step S113.

At step S113 (updating unit), the momentary PM-combustion amount MMLcomb is integrated to be the integrated PM-combustion amount IMLcomb. That is, the calculated momentary PM-combustion amount MMLcomb is added to a previous integrated PM-combustion amount IMLcomb stored in the memory, so that the previous integrated PM-combustion amount IMLcomb is updated to be a present integrated PM-combustion amount IMLcomb. The integrated PM-combustion amount IMLcomb is a particle amount decreased by combustion after the PM-accumulation amount ML exceeds the increasing-transitional accumulation amount ITML. Subsequently, the routine returns to step S102.

Accordingly, if the amount of the accumulated particles PM decreases before the particulate filter 32 is recovered, the PM-accumulation amount ML is calculated based on the corrected characteristic equation. The corrected characteristic equation is further corrected by the integrated PM-combustion amount IMLcomb every time the exhausted particles PM decreases (steps S104, S105, S107–S113).

Figure 9:
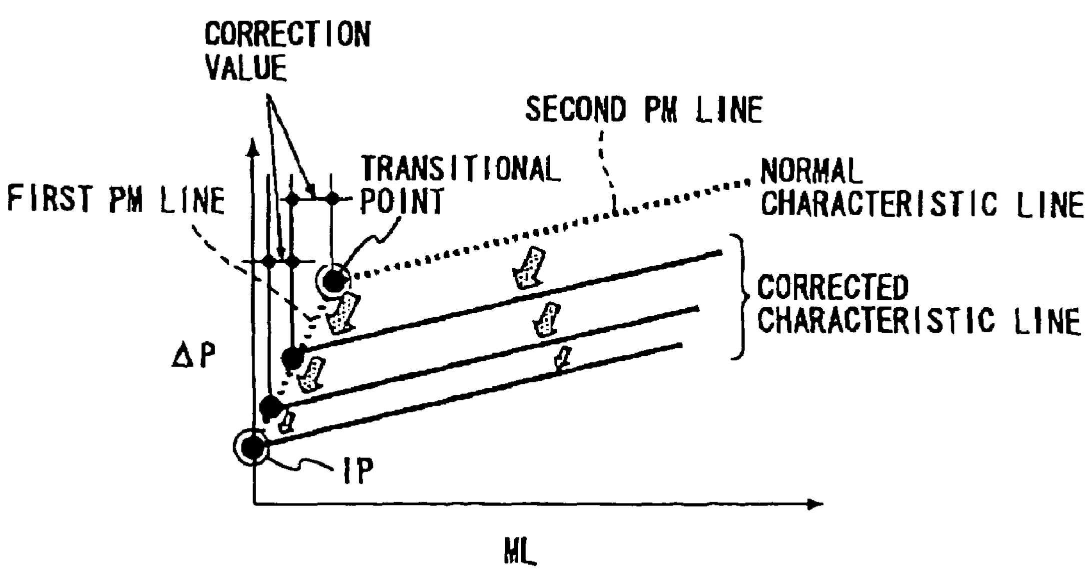
FIG. 9 is a graph of corrected relationships between the amount ML of particles and the pressure drop ΔP.

As shown in FIG. 9, the dotted characteristic (normal characteristic line) line shows a characteristic when the exhausted particles PM are uniformly accumulated without being burned, before the regeneration of the particulate filter 32. The normal characteristic line shows an accumulation characteristic without correction. Referring back to FIG. 6, when the PM-accumulation amount ML increases, the normal characteristic line is defined by the first PM-increase characteristic line and the second PM-increase characteristic line. When the PM-accumulation amount ML decreases, the accumulation characteristic is defined by the first PM-decrease characteristic line and the second PM-decrease characteristic line.

Here, when the accumulated particles PM are burned, the pressure drop ΔP decreases along with the slope of the first PM-decrease characteristic line. In this case, particles plugging the small holes of the particulate filter 32 are mainly burned. The exhausted particles PM are burned, subsequently, the exhausted particles PM restart further accumulation on the PM layer. In this situation, as shown in FIG. 9, the transitional point (increasing-transitional point ITP) of the characteristic line approaches an initial point IP, compared with the transitional point of the normal characteristic line. Here, the PM-accumulation amount ML is 0 at the initial point. When the accumulated particles PM plugging the small holes are burned and eliminated so that the thickness of the accumulated particles becomes thin. Here, an increase of the thickness of the PM-accumulation layer is a dominant factor of the slope of the second PM-decrease characteristic line. The slope of the second PM-increase characteristic line does not change when the accumulation of the particles is restarted, because the PM-accumulation layer remains on the surface of the particulate filter 32 and the small holes are still covered with the PM-accumulation layer. Therefore, exhausted particles PM do not further plug the small holes from outside of the particulate filter 32, in this situation.

Accordingly, the second PM-increase characteristic line is shifted toward the axis of the PM-accumulation amount ML from the position of the normal characteristic line by the integrated PM-combustion amount IMLcomb. The second PM-increase characteristic line becomes a corrected characteristic line after the combustion of the accumulated particles PM. The pressure drop ΔP and the PM-accumulation amount ML follow the corrected accumulation characteristic line after combustion.

Thus, the characteristic line used in the calculation of the PM-accumulation amount ML is corrected so that the PM-accumulation amount ML can be precisely calculated even if the accumulated particles PM are burned before the regeneration of the particulate filter 32. If the PM-accumulation amount ML is calculated using the normal characteristic line, the PM-accumulation amount ML becomes smaller than the actual PM-accumulation amount ML in the particulate filter 32. Therefore, if the normal characteristic line is used for calculating the PM-accumulation amount ML, the regeneration interval is apt to be longer. Accordingly, the particles are apt to be excessively accumulated on the surface of the particulate filter 32. In this case, it is difficult to evade rapid combustion due to the excessively accumulated particles. Accordingly, if the normal characteristic line is used, a regeneration-starting amount MLth of the particles needs to be set at a small value, and the number of the regeneration increases. By contrast, in this embodiment, the accumulation characteristic line is appropriately corrected so that the frequency of the regeneration can be appropriately set.

The shifting amount of the second PM-increase characteristic line is equivalent to the combustion amount of the accumulated PM particles plugging the small holes of the particulate filter 32 (i.e., an amount of the particles accumulated in the small holes and eliminated during the combustion). Accordingly, the shifting amount of the second PM-increase characteristic line is limited. That is, the shifting amount does not exceed the increasing-transitional accumulation amount ITML, in principle. When the shifting amount is equal to the increasing-transitional accumulation amount ITML, the accumulation characteristic line is shifted to pass the initial point IP. Here, the accumulation characteristic line passing the initial point IP has the same slope as that of the second PM-increase characteristic line of the normal characteristic line. Accordingly, at step S104 in FIG. 7, if the correction value (i.e., shifting amount) exceeds the increasing-transitional accumulation amount ITML of the normal characteristic line, the correction value is set at the increasing-transitional accumulation amount ITML of the normal characteristic line.

Here, it is important to precisely calculate the integrated PM-combustion amount IMLcomb for obtaining an appropriately corrected characteristic equation. In this embodiment, the momentary PM-combustion amount MMLcomb is calculated so that the integrated PM-combustion amount IMLcomb is calculated. The steps S110 to S112 are executed so that the momentary PM-combustion amount MMLcomb is calculated. At step S111, the momentary PM-combustion amount MMLcomb is calculated based on a decreasing amount of the pressure drop ΔP and a PM-exhaust amount PMout exhausted from the engine 1. In detail, initially the accumulated particles PM are mainly burned in the small-holes of the particulate filter 32. Accordingly, in this situation, a gain of the pressure drop ΔP with respect to the decreasing amount of the PM-accumulation amount ML is equivalent to the slope of the first PM-decrease characteristic line.

Figure 10:
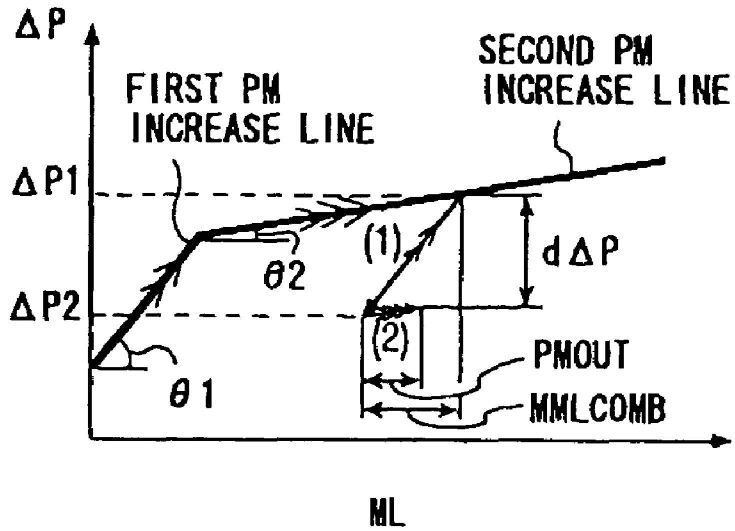
FIG. 10 is a graph of a correcting process of the relationship between the amount ML of particles and the pressure drop ΔP.

In contrast, during the combustion, particles PM are exhausted from the cylinders of the engine 1 and further accumulated on the PM-accumulation layer formed on the particulate filter 32. In this situation, the exhausted particles PM are accumulated on the PM-accumulation layer, and the thickness of the PM-accumulation layer increases. Accordingly, a gain of the pressure drop ΔP with respect to the increasing amount of the PM-accumulation amount ML is equivalent to the slope of the second PM-increase characteristic line. That is, as shown in FIG. 10, the pressure drop ΔP decreases along with a characteristic line (first PM-decrease characteristic line (1)), which has the same slope as that of the first PM-increase characteristic line, from the pressure drop ΔP1 while the accumulated particles PM are burned and eliminated in the small holes. Meanwhile, the exhausted particles PM further accumulation on the PM-accumulation layer and the pressure drop ΔP increases along with the second PM-increase characteristic line (2) (i.e., corrected second PM-increase characteristic line) from the pressure drop ΔP2. Therefore, the momentary PM-combustion amount MMLcomb is calculated as follows.

$$IPML=[d(\Delta P)+\theta\mathbf{2}PM\mathrm{out}]/\theta\mathbf{1} \quad (1)$$

θ1: slope angle of the first PM-decrease characteristic line

θ2: slope angle of the second PM-increase characteristic line d(ΔP): decreasing amount of pressure drop ΔP PMout: amount of exhausted particles PM Here, θ1 is same as the slope angle of the first PM-increase characteristic line, and θ2 is same as the slope angle of the second PM-decrease characteristic line.

Figure 11:
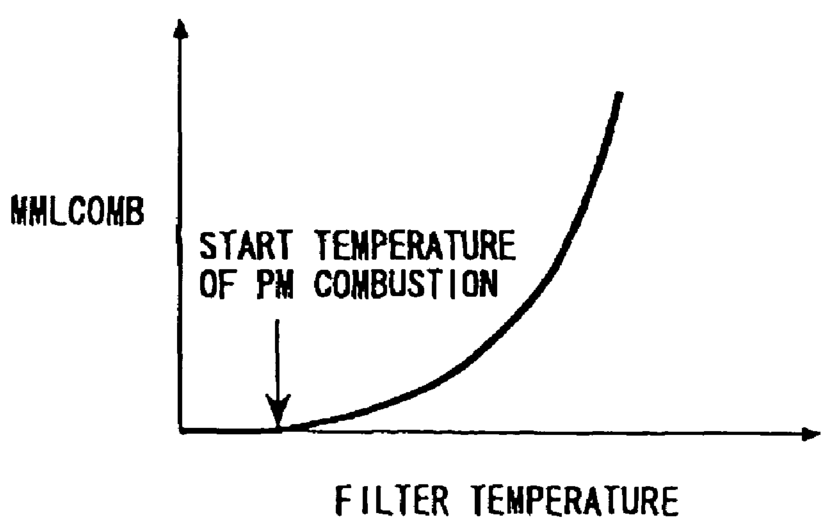
FIG. 11 is a graph of a relationship between a temperature of the particulate filter and a momentary PM-combustion amount MMLcomb.

At step S112 in FIG. 7, the momentary PM-combustion amount MMLcomb is calculated based on the temperature of the particulate filter 32. In detail, the momentary PM-combustion amount MMLcomb is calculated based on a data map of a relationship between the temperature of the particulate filter 32 and the momentary PM-combustion amount MMLcomb, because combustion speed of the exhausted particles PM depends on the temperature of the particulate filter 32. As shown in FIG. 11, the momentary PM-combustion amount MMLcomb increases as the temperature of the particulate filter 32 increases in the data map. The data map is defined in a temperature range higher than the start temperature of PM combustion. The PM combustion starting temperature is a minimum temperature at which the exhausted particles PM accumulated in the particulate filter 32 can be burned.

At step S111 in FIG. 7, the momentary PM-combustion amount MMLcomb is calculated based on the decreasing amount of the pressure drop ΔP and the PM-exhaust amount PMout. In contrast, at step S112, the momentary PM-combustion amount MMLcomb is calculated based on the temperature of the particulate filter 32.

The momentary PM-combustion amount MMLcomb can be more precisely calculated at step S111 in steady operation, compared with step S112. In contrast, the uniformity of the temperature distribution of the particulate filter 32 decreases during unsteady operation, such as in a transient state. In this situation, the slope angles θ1 and θ2 become inappropriate values. Here, the slope angles θ1 and θ2 define the relationship between the decreasing amount of the pressure drop ΔP and the decreasing amount of the PM-accumulation amount ML. Accordingly, if the calculating method performed at step S111 is used during unsteady operation, the degree of calculation error increases. Therefore, the method performed at step S112 is preferable during unsteady operation. In this embodiment, the momentary PM-combustion amount MMLcomb can be calculated based on a method selected from the two methods (i.e., S111 and S112) depending on the operating condition. Therefore, the integrated PM-combustion amount IMLcomb can be precisely calculated.

In this embodiment, the characteristic line is corrected every time the momentary PM-combustion amount MMLcomb is calculated. However, the momentary PM-combustion amount MMLcomb may include fluctuations. Accordingly, the characteristic line can be corrected in a stepwise fashion, when the momentary PM-combustion amount MMLcomb increases by a predetermined amount. In this case, the calculation processes can be decreased. When a positive determination is made at step S106, the regeneration of the particulate filter 32 is performed at step S114. The regeneration of the particulate filter 32 is performed by post injection from an injector, for example.

At step 115, PM-accumulation amount ML is calculated using a corrected characteristic equation. The corrected characteristic equation is the same as the second PM-increase characteristic line, and defined by a straight line passing the initial point IP. The pressure drop ΔP decreases along with the second PM-increase characteristic line as the regeneration of the particulate filter 32 proceeds, after the particles PM accumulated in the small holes of the particulate filter 32 are burned and eliminated.

At step S116, it is determined whether the PM-accumulation amount ML is less than a regeneration-completing amount RCML. The regeneration-completing amount RCML is an amount at which the regeneration of the particulate filter 32 is completed. If a negative determination is made at step S116, the routine returns to step S115. Steps S115 and S116 are repeated until a positive determination is made at step S116. If a positive determination is made at step S116, the routine proceeds to step S117. At step S117, the post injection or the like is stopped, and the regeneration of the particulate filter 32 is completed. In this situation, the accumulated particles PM are completely burned and eliminated. Therefore, the correcting of the characteristic equation is not needed. At step S118, the characteristic equation correcting flag FLC is turned off. At step S119, the integrated PM-combustion amount IMLcomb is reset. The integrated PM-combustion amount IMLcomb is used in a period until the next regeneration is performed to the particulate filter 32.

Thus, the PM-accumulation amount ML is precisely calculated, so that the regeneration of the particulate filter 32 can be performed in an appropriate timing in this gas purification apparatus. Therefore, too early of a regeneration of the particulate filter 23 can be prohibited, and energy efficiency can be secured. Additionally, the particulate filter 32 can also be prevented from an excessive temperature increase due to delay of the regeneration, and engine power can be secured.

[Second Embodiment]

Figure 12:
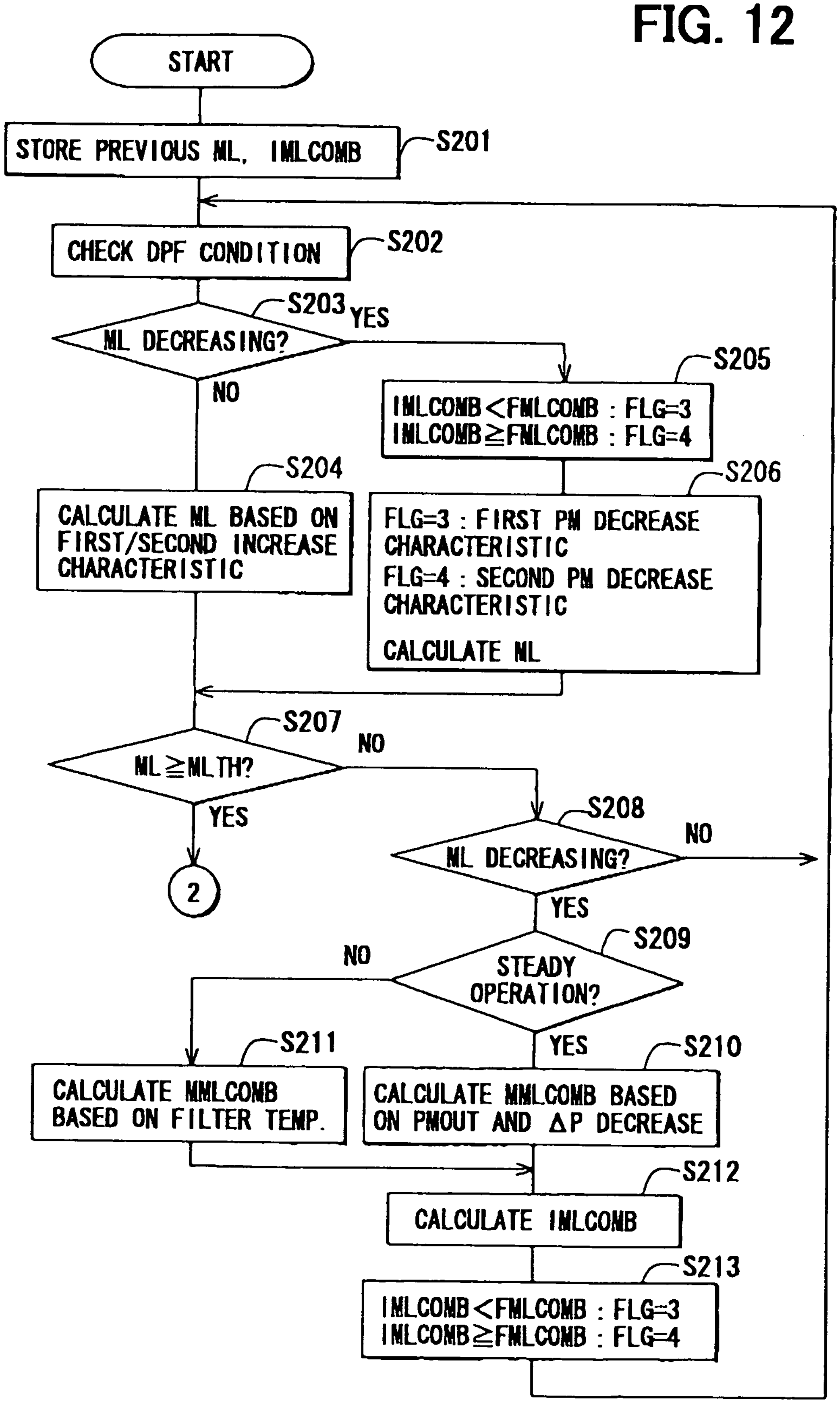
FIG. 12 is a first flowchart of a control routine executed by the ECU of the internal combustion engine using an exhaust gas purification system according to the second embodiment of the present invention.
Figure 13:
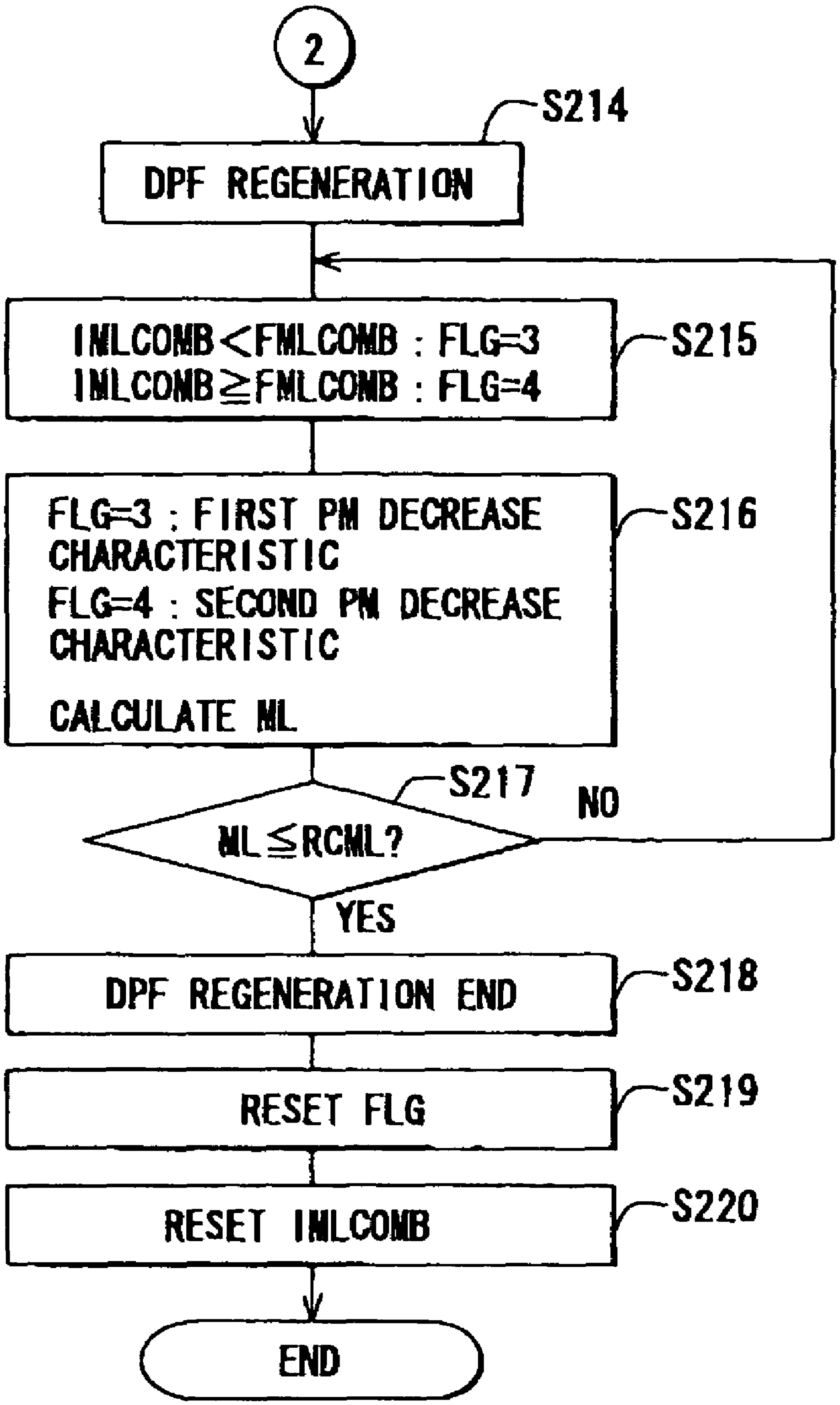
FIG. 13 is a second flowchart of a control routine executed by the ECU according to the second embodiment.

As shown in FIGS. 12 and 13, at step S201, previous operation statuses are stored. The previous operation statuses are the PM-accumulation amount ML, the integrated PM-combustion amount IMLcomb, a position of a characteristic equation flag FLG and the like, when the engine 1 was previously stopped. Here, the characteristic equation flag FLG has two positions (3 and 4).

Steps S202 and S208 are detecting units (exhaust particle detecting units) of the combusting condition of the accumulated particles PM. Steps S203 to S206 are determining units (regeneration determining units). At step S202, the condition of the particulate filter 32 is estimated in the same manner as that of step S107 in the first embodiment. At step S203, it is determined whether the PM-accumulation amount ML decreases or not, based on the result of step S202. At step S203, when a negative determination is made, the routine proceeds to step S204. Otherwise, when a positive determination is made at step S203, the routine proceeds to step S205.

At step S204, the PM-accumulation amount ML is calculated based on a characteristic equation (i.e., first PM-increase characteristic line and second PM-increase characteristic line), in which the PM-accumulation amount ML increases. The PM-accumulation amount ML is calculated based on the first PM-increase characteristic line before the PM-accumulation amount ML exceeds the increasing-transitional accumulation amount ITML. The PM-accumulation amount ML is calculated based on the second PM-increase characteristic line after the PM-accumulation amount ML exceeds the increasing-transitional accumulation amount ITML. Subsequently, the routine proceeds to step S207.

At step S205, if the integrated PM-combustion amount IMLcomb is less than a decreasing amount (first PM-combustion amount FMLcomb) of the PM-accumulation amount ML between a regeneration starting point RSP and the decreasing-transitional point DTP (FIG. 6), the characteristic flag FLG is set at 3. If the integrated PM-combustion amount IMLcomb is equal to or greater than the first PM-combustion amount FMLcomb, the characteristic flag FLG is set at 4. Here, the first PM-combustion amount FMLcomb is substantially equivalent to the increasing-transitional accumulation amount ITML of particles collected by the small holes of the particulate filter 32. The first PM-combustion amount FMLcomb is also equivalent to an amount of the particles PM plugging the small holes of the particulate filter 32 after the regeneration of the particulate filter 32.

When the integrated PM-combustion amount IMLcomb exceeds the first PM-combustion amount FMLcomb, the amount of the accumulated particles PM plugging the small holes are substantially burned and eliminated. Before the integrated PM-combustion amount IMLcomb exceeds the first PM-combustion amount FMLcomb, the pressure drop ΔP decreases along with the first PM-decrease characteristic line. After the integrated PM-combustion amount IMLcomb exceeds the first PM-combustion amount FMLcomb, the pressure drop ΔP decreases along with the second PM-decrease characteristic line.

Referring back to FIG. 12, at step S206, the PM-accumulation amount ML is calculated. Here, if the characteristic flag FLG is set at 3, the PM-accumulation amount ML is calculated based on the first PM-decrease characteristic line. If the characteristic flag FLG is set at 4, the PM-accumulation amount ML is calculated based on the second PM-decrease characteristic line.

The first PM-decrease characteristic line and the second PM-decrease characteristic line are defined in the progress of the routine, in a different manner from the predetermined first PM-increase characteristic line. In this embodiment, the second PM-increase characteristic line is initially predetermined to be a characteristic line equivalent to the normal characteristic line in the first embodiment. However, this second PM-increase characteristic line is modified when the PM-accumulation amount ML decreases.

At step S207, it is determined whether the PM-accumulation amount ML is equal to or greater than the regeneration-starting amount MLth in the same manner as step S106 in the first embodiment. If a positive determination is made at step S207, a routine after step S214 (FIG. 11) is executed, so that the regeneration of the particulate filter 32 is performed. If the PM-accumulation amount ML is less than the regeneration-starting amount MLth, a negative determination is made at step S207, and the routine proceeds to step S208.

At step S208, it is determined whether the PM-accumulation amount ML is decreasing, based on the result of step S202, in the same manner as step S203. At step S208, when a positive determination is made, the routine proceeds to step S209. Otherwise, at step S208, when a negative determination is made, the routine proceeds to step S202.

Steps S209 to S212 are integrating units (exhaust particle integrating units) for integrating the combustion amount of the accumulated particles PM.

At step S209, it is determined whether the operating condition is in the steady operating condition, in the same manner as step S110 in the first embodiment. Here, step S209 is the operating condition determining unit. If a positive determination is made at step S209, the routine proceeds to step S210. At step S210, the momentary PH-combustion amount MMLcomb is calculated based on the decreasing amount of the pressure drop ΔP, and the PM-exhaust amount PMout from the cylinder of the engine 1, in the same manner as step S111 in the first embodiment. If a negative determination is made at step S209, the routine proceeds to step S211. At step S211, the momentary PM-combustion amount MMLcomb is calculated based on the temperature of the particulate filter 32, in the same manner as step S112 in the first embodiment.

After executing the routine at step S210 or step S211, the routine proceeds to step S212. At step S212 (updating unit), the momentary PM-combustion amount MMLcomb is integrated to be the integrated PM-combustion amount IMLcomb, in the same manner as step S113 in the first embodiment. At step S213, if the integrated PM-combustion amount IMLcomb calculated at step S212 is less than the first PM-combustion amount FMLcomb, the characteristic flag FLG is set at 3. Otherwise, if the integrated PM-combustion amount IMLcomb is equal to or greater than the first PM-combustion amount FMLcomb, the characteristic flag FLG is set at 4. Subsequently, the routine returns to step S202.

When the PM-accumulation amount ML does not decrease, the PM-accumulation amount ML is calculated based on the first PM-increase characteristic line and the second PM-increase characteristic line. By contrast, when the PM-accumulation amount ML decreases, the PM-accumulation amount ML is calculated based on the first PM-decrease characteristic line and the second PM-decrease characteristic line (steps S203–S206 and steps S208–S213). Here, if the integrated PM-combustion amount IMLcomb is less than the first PM-combustion amount FMLcomb, the first PM-decrease characteristic line is used for the calculation of the PM-accumulation amount ML. By contrast, if the integrated PM-combustion amount IMLcomb is equal to or greater than the first PM-combustion amount FMLcomb, the second PM-decrease characteristic line is used for the calculation of the PM-accumulation amount ML.

Figure 14:
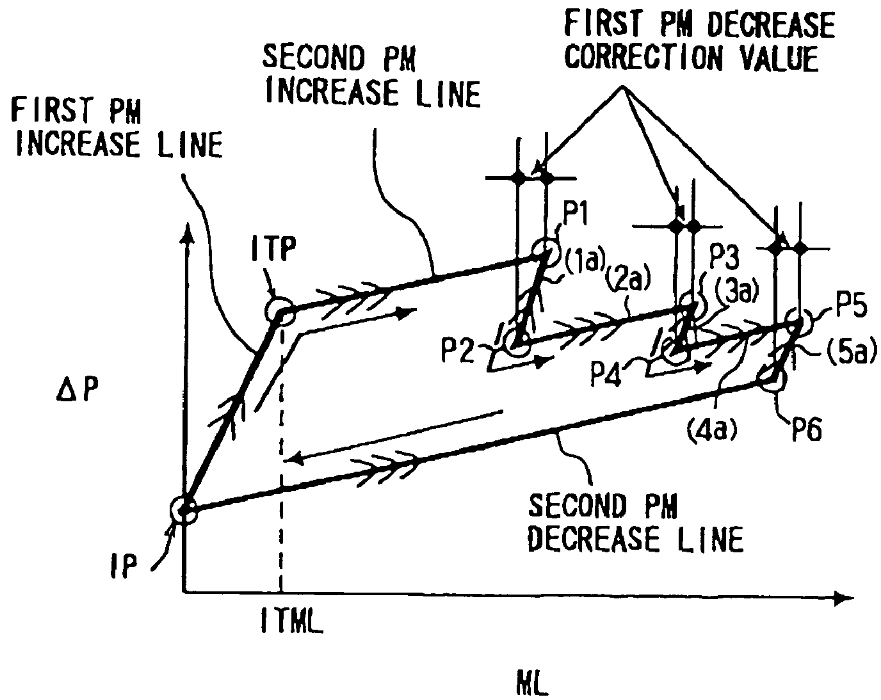
FIG. 14 is a graph of a correcting process of the relationship between the amount ML of particles and the pressure drop ΔP according to the second embodiment.

Next, a characteristic of a relationship between the pressure drop ΔP and the PM-accumulation amount ML, and a characteristic equation used for the calculation of the PM-accumulation amount ML will be described, with respect to a process before the regeneration of the particulate filter 32. As shown in FIG. 14, plugging of the accumulated particles PM into the small holes of the particulate filter 32 is a dominant factor of the increase of the pressure drop ΔP, before the PM-accumulation amount ML becomes equal to or greater than the increasing-transitional accumulation amount ITML. In this period, if the accumulated particles PM plugging the small holes are burned, the pressure drop ΔP returns to the initial point IP along with the first PM-increase characteristic line.

The pressure drop ΔP increases along with the second PM-increase characteristic line, after exceeding the increasing-transitional point ITP. When the accumulated particles PM plugging the small holes are burned in this period, the PM-accumulation amount ML rapidly decreases. That is, the decreasing amount of the pressure drop ΔP becomes large with respect to the decreasing amount of the PM-accumulation amount ML in the same way as shown by (1) in FIG. 10. Here, when the PM-accumulation amount ML decreases in this period at P1, a first PM-decrease characteristic line (1*a*) is set to pass the pressure drop ΔP and the PM-accumulation amount ML at that moment. The first PM-decrease characteristic line (1*a*) in FIG. 14 is equivalent to the first PM-decrease characteristic line (1) in FIG. 10, and has the same slope angle θ1 as that of the first PM-decrease characteristic line. Therefore, in this case, the PM-accumulation amount ML is calculated in accordance with the first PM-increase characteristic line (1*a*) which has a slope (gain) the same as that of the first PM-increase characteristic line.

Here, a characteristic in the present combustion/combustion process and a characteristic in the previous combustion/combustion process are considered to have an equivalent relationship between the pressure drop ΔP and the PM-accumulation amount ML. Therefore, the pressure drop ΔP and the PM-accumulation amount ML at P1 when the PM-accumulation amount ML starts decreasing (present process) are calculated in accordance with a previous relationship (previous process) between the pressure drop ΔP and the PM-accumulation amount ML in the second PM-increase characteristic line. When the PM-accumulation amount ML returns to be in the increasing state from the decreasing state at P2, a second PM-increase characteristic line (2*a*) is set to pass the pressure drop ΔP and the PM-accumulation amount ML at that moment. The second PM-increase characteristic line (2*a*) in FIG. 14 is equivalent to the second PM-increase characteristic line (2) in FIG. 10, and has the same slope angle θ2 as that of the second PM-increase characteristic line. Here, the PM-accumulation amount ML is calculated in accordance with the second PM-increase characteristic line (2*a*). The second PM-increase characteristic line (2*a*) has a slope (gain) the same as that of the second PM-increase characteristic line of the normal characteristic line in the first embodiment.

Here, the pressure drop ΔP and the PM-accumulation amount ML at P2 when the PM-accumulation amount ML starts increasing (present process) are calculated in accordance with the previous relationship (previous process) between the pressure drop ΔP and the PM-accumulation amount ML in the first PM-decrease characteristic line. Subsequently, when the PM-accumulation amount ML returns to be in the decreasing state from the increasing state at P3, a first PM-decrease characteristic line (3*a*) is set to pass the pressure drop ΔP and the PM-accumulation amount ML at the moment. The first PM-decrease characteristic line (3*a*) is equivalent to the first PM-decrease characteristic line (1*a*), and has the same slope angle θ1 as that of the first PM-increase characteristic line.

Therefore, the decreasing state (1*a*, 3*a*) of the PM-accumulation amount ML and the increasing state (2*a*) of the PM-accumulation amount ML alternatively appear. Accordingly, the first PM-decrease characteristic line and the second PM-increase characteristic line are alternatively set in accordance with the alternative increases/decrease states of the PM-accumulation amount ML. The integrated PM-combustion amount IMLcomb increases while repeating the alternative changes of the states.

The integrated PM-combustion amount IMLcomb is a total decreasing amount of the PM-accumulation amount ML (i.e., total amount of the first PM-correction value in FIG. 14) while the PM-accumulation amount ML decreases in the decreasing states. When the integrated PM-combustion amount IMLcomb becomes equal to or greater than the PM-combustion amount FMLcomb at P6, the second PM-decrease characteristic line is set to pass the pressure drop ΔP and the PM-accumulation amount ML at that moment. Here, the integrated PM-combustion amount IMLcomb at P6 is equivalent to the increasing-transitional accumulation amount ITML in FIG. 6, because the accumulated particles PM plugging the small holes are entirely burned and eliminated at P6. In this situation, the PM-accumulation amount ML is calculated based on the second PM-decrease characteristic line. Here, P6 is equivalent to the decreasing-transitional point DTP in FIG. 6.

The second PM-decrease characteristic line has the same slope as that of the second PM-increase characteristic, and the slope is gentler than that of the first PM-decrease characteristic (e.g., 1*a*, 3*a* and 5*a*). The second PM-decrease characteristic passes the initial point IP. The second PM-decrease characteristic line, which is set after the particles plugging the small holes are all burned and eliminated, becomes equivalent to the second PM-increase characteristic line. That is, after the particles PM plugging the small holes are burned, the second PM-decrease characteristic line shows the same characteristic (same slope) as that of the second PM-increase characteristic line. In this situation, the variation amount of the pressure drop ΔP with respect to the PM-accumulation amount ML is substantially same in both directions where the PM-accumulation amount ML increases and decreases. Because the pressure drop ΔP depends on the thickness of the particles PM accumulation on the surface of the PM-accumulation layer, after the plugging particles PM are burned. Therefore, after the second PM-decrease characteristic line is set, the PM-accumulation amount ML is calculated in accordance with the second PM-decrease characteristic line, in both states in which the PM-accumulation mount ML increases and the PM-accumulation mount ML decreases.

Thus, the PM-accumulation characteristic is appropriately set for calculating the PM-accumulation mount ML. The PM-accumulation mount ML can be precisely calculated, even if the particles PM accumulated in the particulate filter 32 is burned and decreased before the regeneration of the particulate filter 32.

If the normal accumulation property (i.e., normal characteristic line) is used in the calculation of the PM-accumulation amount ML, the PM-accumulation amount ML may be calculated smaller than the actual PM-accumulation amount ML. Therefore, it is difficult to completely evade the rapid combustion of the accumulated particles PM. In this case, the regeneration starting point of the PM-accumulation amount ML needs to be set smaller, and frequency of the regeneration may be increased. By contrast, in the present invention, the regeneration can be performed at an appropriate frequency.

In this embodiment, the momentary PM-combustion amount MMLcomb is calculated in accordance with the operating condition of the engine 1, so that the integrated PM-combustion amount IMLcomb is calculated. However, the integrated PM-combustion amount IMLcomb can be calculated in accordance with the characteristic line of the relationship between the pressure drop ΔP and the PM-accumulation amount ML. Specifically, when the increasing state of the accumulated particles ML is changed to the decreasing state, the PM-accumulation amount ML is calculated in accordance with the characteristic line having the same angle degree as that of the first PM-decrease characteristic line. In this period, the decreasing amount of the PM-accumulation amount ML can be integrated for calculating the integrated PM-combustion amount IMLcomb.

Next, the process after the PM-accumulation amount ML becomes equal to or greater than the regeneration-starting amount MLth at the regeneration starting point RSP will be described in detail. If a positive determination is made at step S207 in FIG. 12, the particulate filter 32 is recovered by the regeneration method, such as the post injection at step S214. At step S215, if the integrated PM-combustion amount IMLcomb is less than the first PM-combustion amount FMLcomb, the characteristic flag FLG is set at 3. If the integrated PM-combustion amount IMLcomb is equal to or greater than the first PM-combustion amount FMLcomb, the characteristic flag FLG is set at 4. At step S216, if the characteristic flag FLG is 3, the PM-accumulation amount ML is calculated in accordance with the first PM-decrease characteristic line. By contrast, if the characteristic flag FLG is 4, the PM-accumulation amount ML is calculated in accordance with the second PM-decrease characteristic line.

At step S217, it is determined whether the PM-accumulation amount ML is less than the regeneration-completing amount RCML. If a negative determination is made at step S217, the routine returns to step S215, and the routine between step S215 and step S217 are repeated until a positive determination is made at step S217. If a positive determination is made at step S217, the regeneration method, such as the post injection, is stopped, so that the regeneration of the particulate filter 32 is completed at step 218. At step S219, the characteristic flag FLG is reset. At step S220, the integrated PM-combustion amount IMLcomb is reset.

Thus, the PM-accumulation amount ML is precisely calculated, so that the regeneration of the particulate filter 32 can be performed at appropriate timings in this gas purification apparatus according to the present invention. Therefore, decrease of energy efficiency, which is caused by too early regeneration of the particulate filter 23, can be prevented. Additionally, decrease of engine power and excessive temperature increase of the particulate filter 32 due to delay of the regeneration can be also prevented.

Figure 15:
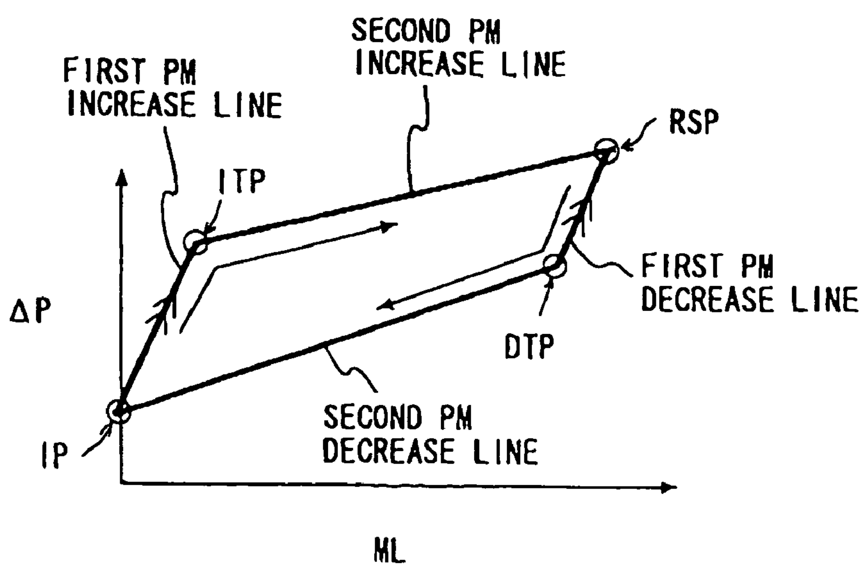
FIG. 15 is a graph of a relationship between the amount ML of particles and the pressure drop ΔP according to a first modification of the present invention.
Figure 16:
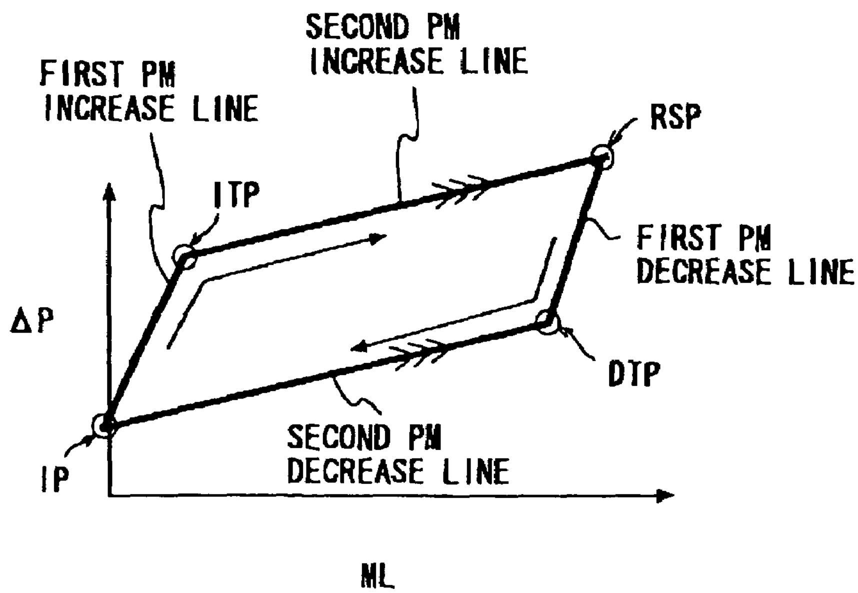
FIG. 16 is a graph of a relationship between the amount ML of particles and the pressure drop ΔP according to a second modification of the present invention.

In the above embodiments, the first PM-increase characteristic line and the first PM-decrease characteristic line are in parallel, and the second PM-increase characteristic line and the second PM-decrease characteristic line are also in parallel. However, the combusting condition of the accumulated particles PM in the particulate filter 32 can be different depending on the temperature distribution in the DPF walls. Accordingly, the characteristic line shown in FIG. 6 may not be necessarily appropriate. Therefore, as shown in FIG. 15, the second PM-increase characteristic line and the second PM-decrease characteristic line can be non-parallel. Alternatively, as shown in FIG. 16, the first PM-increase characteristic line and the first PM-decrease characteristic line can be non-parallel.

Figure 17:
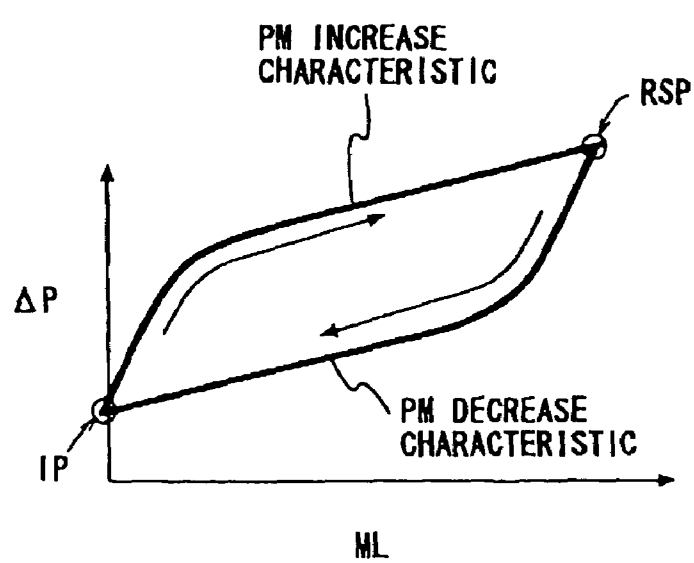
FIG. 17 is a graph of a relationship between the amount ML of particles and the pressure drop ΔP according to a third modification of the present invention.
Figure 18:
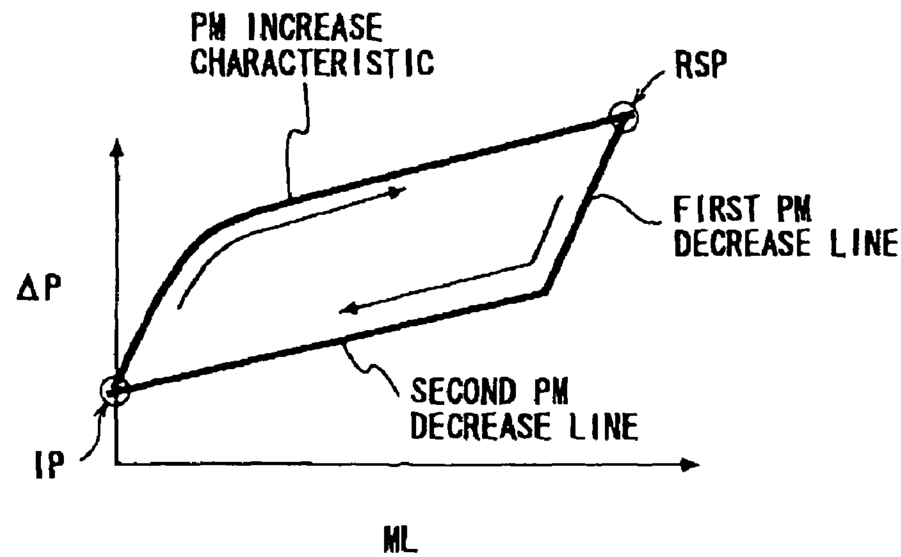
FIG. 18 is a graph of a relationship between the amount ML of particles and the pressure drop ΔP according to a fourth modification of the present invention.
Figure 19:
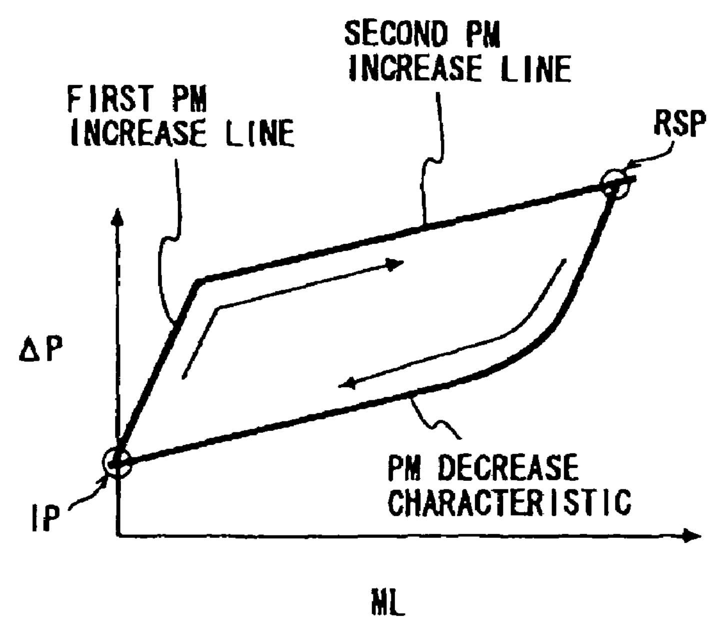
FIG. 19 is a graph of a relationship between the amount ML of particles and the pressure drop ΔP according to a fifth modification of the present invention.

The increasing characteristic and the decreasing characteristic can be curved lines. Specifically, as shown in FIG. 17, the PM-increasing characteristic can be an upwardly curving line, and the PM-decreasing characteristic can be a downwardly curving line. That is, the PM-increasing characteristic can be a curved line protruded in a direction where the pressure drop $\Delta P$ becomes large, and the PM-decreasing characteristic can be a curved line protruded in a direction where the pressure drop $\Delta P$ becomes small. As shown in FIGS. 18 and 19, either of the decreasing characteristic or the increasing characteristic can be defined by straight lines.

In the above embodiments, the calculation of the PM-accumulation amount ML based on the pressure drop $\Delta P$ can be stopped when the operating condition is in a specific condition. The pressure drop $\Delta P$ is expressed by a polynomial including a square of the flow rate of the exhaust gas. Accordingly, when the flow rate of the exhaust gas is small, a sufficient pressure drop $\Delta P$ is not generated at the particulate filter 32. In this case, measurement accuracy of the PM-accumulation amount ML becomes bad. Therefore, the calculation of the PM-accumulation amount ML based on the pressure drop $\Delta P$ can be stopped when the flow rate of the exhaust gas is less than a predetermined value. Thus, the calculation of the PM-accumulation amount ML can be calculated precisely, regardless of the flow rate of the exhaust gas.

Various modifications and alternation may be made to the above embodiments without departing from the spirit of the present invention.

What is claimed is:

1. An exhaust gas purification system for an internal combustion engine, the exhaust gas purification system having a particulate filter in an exhaust passage for collecting particles included in exhaust gas and for burning and removing the particles accumulated in the particulate filter for recovering the particulate filter, the exhaust gas purification system comprising:

a pressure drop detecting unit that detects a pressure drop of the particulate filter;

a regeneration determining unit that defines an accumulation characteristic of a relationship between the accumulation amount ML of the particles and the pressure drop, wherein:

the regeneration determining unit defines a first characteristic line, which is a straight line passing an initial point in which the accumulation amount ML is zero, and a second characteristic line, which is a straight line having a smaller slope value compared with a slope of the first characteristic line;

the accumulation characteristic is defined by the first characteristic line and the second characteristic line;

the pressure drop increases along with the first characteristic line from the initial point to a predetermined increasing transitional point, and increases along with the second characteristic line from the increasing transitional point;

the regeneration determining unit calculates the accumulation amount ML based on the accumulation characteristic and an operating condition of the internal combustion engine which includes at least the pressure drop; and the regeneration determining unit determines whether the accumulation amount ML exceeds a predetermined regeneration-starting amount MLth for determining whether the regeneration of the particulate filter needs to be performed;

a exhaust particle detecting unit that detects a combusting condition of the particles accumulated in the particulate filter; and a correcting unit that corrects the accumulation characteristic so that the second characteristic line is substantially parallely shifted to a direction, in which the accumulation amount ML becomes large when the particles are in the combusting condition.

2. The exhaust gas purification system according to claim 1, further comprising:

a exhaust particle integrating unit that integrates a decreasing amount of the accumulation amount ML of the particles, that is burned before the regeneration of the particulate filter due to high temperature exhaust gas and partially burned due to termination (interruption) of a previous regeneration, for calculating an integrated combustion amount IMLcomb, wherein the correcting unit performs correcting such that a shifting amount of the second characteristic line becomes large as the integrated combustion amount IMLcomb increases so that the accumulation amount ML becomes larger with respect to the same pressure drop.

3. The exhaust gas purification system according to claim 1, wherein the corrected second characteristic line passes the initial point when the correcting unit sets a maximum shifting amount to the second characteristic line.

4. An exhaust gas purification system for an internal combustion engine, the exhaust gas purification system having a particulate filter in an exhaust passage for collecting particles included in exhaust gas, and for burning and removing the particles accumulated in the particulate filter for recovering the particulate filter, the exhaust gas purification system comprising:

a pressure drop detecting unit that detects a pressure drop of the particulate filter;

a regeneration determining unit that defines an accumulation characteristic of a relationship between an accumulation amount ML of the particles and the pressure drop, wherein:

the regeneration determining unit has an increase characteristic line, which is protruded to a direction where the pressure drop becomes large and passing an initial point, and a decrease characteristic line protruded to a direction where the pressure drop becomes small;

the accumulation characteristic is defined by the increase characteristic line and the decrease characteristic line;

the pressure drop increases along with the increase characteristic line from the initial point, and decreases along with the decrease characteristic line to the initial point;

the regeneration determining unit calculates the accumulation amount ML based on the accumulation characteristic and an operating condition of the internal combustion engine which includes at least the pressure drop; and the regeneration determining unit determines whether the accumulation amount exceeds a predetermined regeneration-starting amount for determining whether the regeneration of the particulate filter needs to be performed; and an exhaust particle detecting unit that detects a burning condition of the particles accumulated in the particulate filter, wherein the regeneration determining unit calculates the accumulation amount ML based on the increase characteristic when the particles are in a non-combusting condition, and calculates the accumulation amount ML based on the decrease characteristic when the particles are in the combusting condition.

5. The exhaust gas purification system according to claim 4, wherein the regeneration determining unit calculates the accumulation amount ML based on the slope of the decreasing characteristic line passing the pressure drop and the accumulation amount at a time point when a condition of the particles changes from the non-combusting condition to the combusting condition; and the regeneration determining unit calculates the accumulation amount ML based on the slope of the increasing characteristic line passing the pressure drop and the accumulation amount at a time point when the condition of the particles changes from the combusting condition to the non-combusting condition.

6. The exhaust gas purification system according to claim 4, wherein the increase characteristic is defined by a first increase characteristic line, which is a straight line passing the initial point, and a second increase characteristic line, which is a straight line passing an increasing transitional point and having a smaller slope value compared with a slope of the first increase characteristic line; and the pressure drop increases along with the first increase characteristic line from the initial point to the increasing transitional point, and increases along with the second increase characteristic line from the increasing transitional point.

7. The exhaust gas purification system according to claim 4, wherein the decreasing characteristic is defined by a first decrease characteristic line, which is a straight line passing the pressure drop and the accumulation amount at a point in time, and a second decrease characteristic line, which is a straight line passing a decreasing transitional point and having a lower slope value compared with a slope of the first decrease characteristic line; and the pressure drop decreases along with the first decrease characteristic line to the decreasing transitional point, and decreases along with the second decrease characteristic line from the decrease transitional point to the initial point.

8. The exhaust gas purification system according to claim 4, wherein the increasing characteristic is defined by a first increase characteristic line, which is a straight line passing the initial point, and a second increase characteristic line, which is a straight line passing an increasing transitional point and having a lower slope value compared with a slope of the first increase characteristic line;

the decrease characteristic is defined by a first decrease characteristic line, which is a straight line passing the pressure drop and the accumulation amount at the moment, and a second decrease characteristic line, which is a straight line passing an decreasing transitional point and having a gentler slope compared with a slope of the first decrease characteristic line;

the pressure drop increases along with the first increase characteristic line from the initial point to the increasing transitional point, and increases along with the second increase characteristic line from the increase transitional point;

the pressure drop decreases along with the first decrease characteristic line to the decreasing transitional point, and decreases along with the second decrease characteristic line from the decrease transitional point to the initial point; and at least one relationship between the first increase characteristic line and the first decrease characteristic line, and between the second increase characteristic line and the second decrease characteristic line, is represented by substantially parallel lines.

9. The exhaust gas purification system according to claim 7, wherein the regeneration determining unit calculates the accumulation amount ML based on the first decrease characteristic line passing the pressure drop and the accumulation amount at the moment, when the condition of the particles changes from the combusting condition to the non-combusting condition.

10. The exhaust gas purification system according to claim 9, further comprising:

a exhaust particle integrating unit that integrates a decreasing amount of the accumulation amount ML of the particles, that is burned due to high temperature exhaust gas before the regeneration of the particulate filter and partially burned due to an interruption in a previous regeneration, to calculate an integrated combustion amount IMLcomb, wherein the regeneration determining unit sets the second decrease characteristic line when the integrated combustion amount IMLcomb becomes equal to or greater than a predetermined amount.

11. The exhaust gas purification system according to claim 2, wherein the exhaust particle integrating unit includes a first calculating unit that calculates a decreasing amount of the accumulation amount based on a decreasing amount of the pressure drop, and calculates an exhaust amount PMout based on an operating condition of the internal combustion engine, and calculates the decreasing amount of the accumulation amount ML by adding the decreasing amount of the accumulation amount to the PM-exhaust amount PMout and a second calculating unit calculates the decreasing amount of the accumulation amount based on a temperature of the particulate filter;

an operating condition determining unit determines whether the internal combustion engine is in a steady operating condition or not; and an updating unit that calculates the integrated combustion amount IMLcomb based on the decreasing amount of the accumulation amount ML calculated in the first calculating unit when a positive determination is made in the operating condition determining unit, and calculates the integrated combustion amount IMLcomb based on the decreasing amount of the accumulation amount ML calculated in the second calculating unit when a negative determination is made in the operating condition determining unit.

12. The exhaust gas purification system according to claim 11, wherein the operating condition determining unit estimates the temperature distribution of the particulate filter, and determines if an operating condition is in a steady condition when a temperature distribution of the particulate filter is substantially uniform.

* * * * *